W. F. CORNELIUS.
TRAP.
APPLICATION FILED FEB. 8, 1916.

1,249,337.

Patented Dec. 11, 1917.

Witness
J. Gordon Hackie

Inventor
W. F. Cornelius
By
Attorney

UNITED STATES PATENT OFFICE.

WILLIAM FELIX CORNELIUS, OF BIRMINGHAM, ALABAMA.

TRAP.

1,249,337.      Specification of Letters Patent.      Patented Dec. 11, 1917.

Application filed February 8, 1916. Serial No. 77,001.

*To all whom it may concern:*

Be it known that I, WILLIAM F. CORNELIUS, a citizen of the United States of America, residing at Birmingham, in the county of Jefferson and State of Alabama, have invented certain new and useful Improvements in Traps, of which the following is a specification.

My invention relates to traps adapted for use in catching or destroying mice, rats and larger animals.

Instead of utilizing trap doors and like means for entrapping the quarry, I have conceived of the use of a reciprocable plunger mechanism actuated by a spring or like means and controlled by a trigger mechanism so that when the latter is tripped by the quarry the plunger will spring forward and strike the quarry.

In one arrangement of my invention, the trap is provided with a receiving compartment having a self closing door disposed opposite the plunger so that the latter in striking the quarry will knock it through the door and into the storage compartment. In order that the greatest usefulness may be obtained from the trap, I have provided it with a motor in which energy is stored, such for instance as a spring motor, which is controlled by the trigger and plunger mechanisms so that it will automatically retract the plunger and reset its actuating spring after the plunger has made its stroke. Preferably the plunger is provided with pointed studs or pins to stab or impail the quarry and these are preferably designed so that the quarry will be thrown off of them and into the storage compartment.

My invention also comprises the novel details of construction and arrangements of parts, which in their preferred embodiment only are illustrated in the accompanying drawings, in which:—

Similar reference numerals refer to similar parts throughout the drawings.

Figure 1:
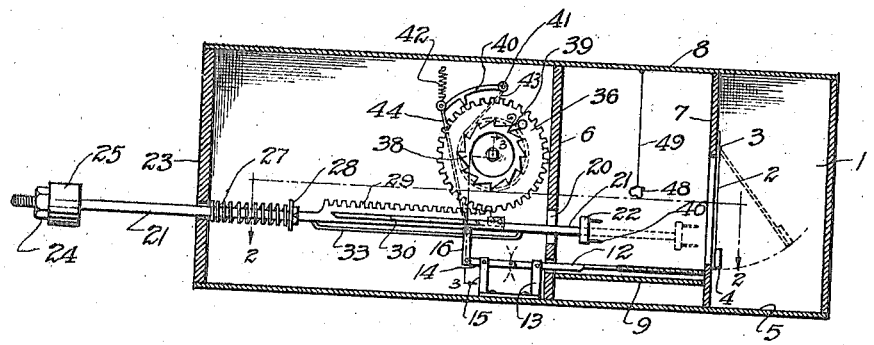
Figure 1 is a vertical sectional view taken longitudinally through the trap.
Figure 2:
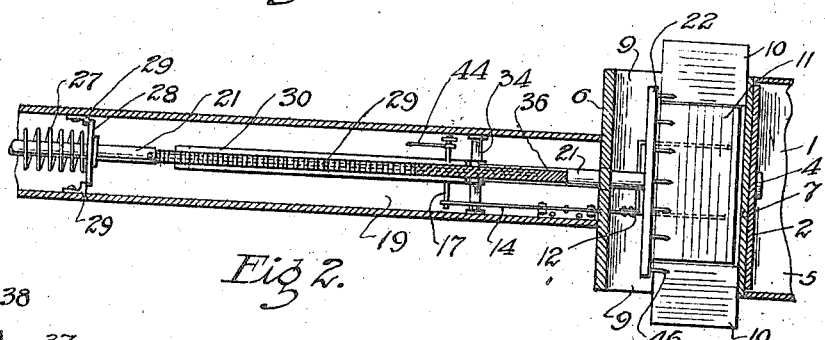
Fig. 2 is a sectional view taken on the line 2—2 of Fig. 1.

As illustrated in the drawings, I show a trap adapted for catching and destroying rats, squirrels, or small animals valued for their pelts or which damage crops. The trap itself comprises at one end a storage compartment 1 closed in on all sides and having an inwardly opening door 2 hinged at 3 and provided with a weight or like means to hold it normally closed and to cause it to close quickly and automatically when released. The lower edge of the door is spaced substantially above the floor 5 of the compartment 1 which is formed by part of the bottom of the trap. The trap has a transverse vertical wall 6 spaced from the wall 7 of the storage compartment and disposed parallel therewith. These walls 6 and 7 are connected overhead to the top 8 of the trap and at their lower ends are connected by a raised bottom 9. The sides of the entrapping compartment bounded by the walls 6, 7, 8 and 9 are left open and inclined runways 10 are provided up which the quarry can walk onto the floor 9. Above the floor 9 is disposed a trigger platform 11 which is connected to the yoke end of a trigger bar 12 which is passed through a suitable opening in the wall 6 and pivoted on a bracket 13 beyond which its free end extends and is loosely pivoted to a rocker arm 14 which is pivoted at an intermediate point to a bracket 15 and having hinged to its free end a yoke member 16 having alining openings which receive a cross pin 17 that is held in position between and guided by vertical guide slots 18 in the side walls of a narrow compartment 19 which forms a housing for the operating mechanism of the trap. The wall 6 has a narrow vertically elongated slot 20 through which a plunger 21 passes freely, having a wide plunger head 22 disposed slightly above the trigger platform. The rear end of the plunger passes through an opening in the end wall 23 of the compartment 19. A nut 24 is screwed on the outer end of the plunger and holds a cushion pad 25 in position to engage the wall 23 and arrest the forward travel of the plunger. A coil spring 27 surrounds the plunger between the wall 23 and a collar 28 made fast on the plunger. This collar is substantially wider than the spring and is adapted to engage stop lugs 29 on the sides of the compartment 19 so as to stop the travel of the plunger at a predetermined point in its travel to the left, i. e., its retracting movement. The spring 27, when released, will tend to thrust the plunger toward the right and to its dotted line position Fig. 1. The intermediate portion of the plunger is flattened and provided along its upper edge with a rack bar 29 and on each side of the rack bar with narrow longitudinal guide flanges 30 which have their ends 31 and 32 beveled in parallel planes. Along under this flattened portion of the plunger is a bar 33 spaced uniformly from the plunger and connected thereto at its upturned ends. The cross pin 17 is received with a loose sliding fit between the plunger and the bar 33. Brackets 34 are attached on each side of the walls 18 and have their inner ends 35 disposed close to the flattened sides of the plunger and either above or below the flanges 30 according to the direction of travel and the position of the plunger relatively thereto. These guide ends 35 are beveled in the same manner as the plunger guides to prevent the flanges 30 hanging against them. I mount a gear wheel 36 to turn on a crank shaft 37 and mesh with and drive the rack 29 when the plunger is in its raised position and to clear the rack when the plunger is in its lowered position. A ratchet wheel 38 fast on shaft 37 is held against clockwise rotation by a spring-pressed pawl 39 mounted on the side of the gear 36. A dog 40 is pivoted to a cross pin 41 and at its free end is engaged by a spring 42 connected to the box and tending to draw the dog out of engagement with the gear 36. To the pin 41 is connected one end of a coil spring 43, its other end being connected to the crank shaft 37 in such manner that it will drive gear 36 clockwise when free to act. A rod 44 connects the pin 17 with the dog so that the latter is drawn into engagement with the gear 36 at the moment the plunger is drawn downwardly to disengage rack 29 from gear 36. The tension on the spring 42 is adjusted to counterbalance the weight of the trigger through the connecting mechanism and support it delicately balanced until such balance is overcome by the weight of the quarry. Pointed spuds 46 are provided on the face of the plunger head 22 which extends crosswise over and beyond the trigger platform 11 but is narrower than the opening for the door 2.

Figures 3, 4, 5, 6:
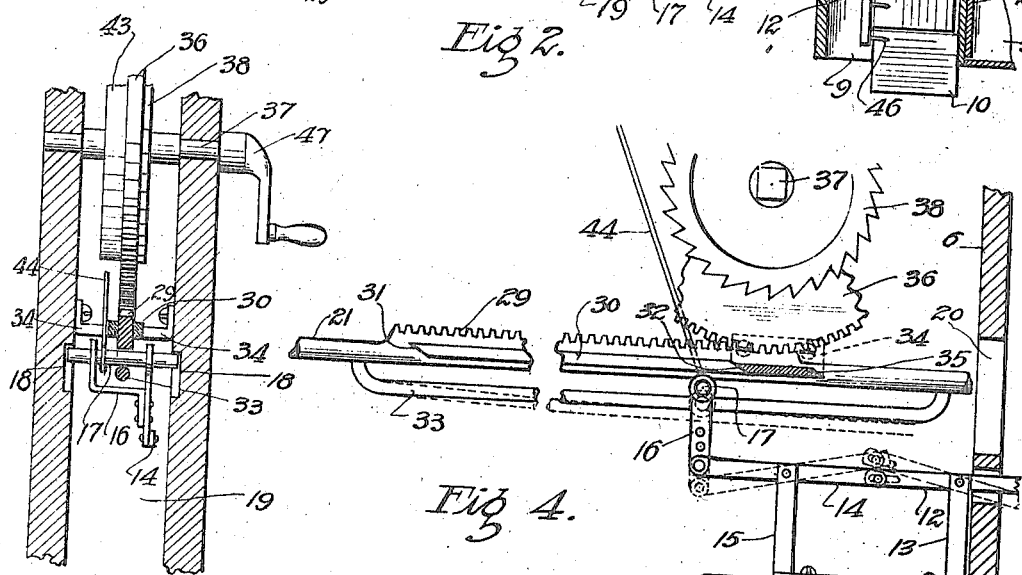
Fig. 3 is an enlarged vertical sectional view taken on the line 3—3 of Fig. 1.
Fig. 4 is an enlarged elevation of the controlling mechanism for the plunger.
Figs. 5 and 6 are diagrammatic views illustrating the manner in which the plunger is automatically shifted to its two planes of horizontal travel.

In operation, assuming that the spring 43 has been wound up by the handle 47 on the crank shaft 37 and that the trap is set with the plunger retracted to the full line position, Fig. 1, in which position the coil spring 27 is under compression, as the quarry walks up onto the floor level 9 it must step on the trigger in order to reach the bait 48 suspended above the trigger by a cord 49 from the top 8 of the trap. The quarry's weight will trip the trigger, throwing the trigger bar 12 and rocker arm 14 to dotted line positions shown in Fig. 4. This will draw downwardly the cross bar 17 and with it the plunger, so as to disengage its rack 29 from gear 36, and the dog 40 so as to hold the gear against rotation. When the plunger is drawn down its side guide flanges 30 are shifted below guides 35 so that as the plunger, when released from the gear 36, springs outwardly under the thrust of spring 37, the plunger flanges 30 will pass under the guides 35 which serve to hold the rack in its lowered position clear of the gear until the plunger reaches its extreme travel to the right and in doing so the plunger will have struck the quarry and forced it against the door 2 which will open and permit it to fall into the compartment 1. When the quarry is knocked off the trigger, the latter is released and responsive to the pull of spring 42 will resume its normal operating position. At the same time the upward pull on the pin 17 will exert an up thrust upon the plunger so that when the plunger reaches the end of its travel, as shown in dotted lines Fig. 6, and clears the guide 35, it will be lifted to its upper or retracting position. When this occurs the rack 29 is brought into engagement with the gear 36 and the dog 40 is disengaged therefrom so that the gear wheel 36 is released to rotate responsive to the action of the spring 43 and being then in mesh with the rack 29, will force the plunger to the left and the guides 35 being then under the flanges 30, will hold the plunger rack in engagement with the gear wheel 36 until it has completed its resetting stroke and the spring seat strikes the stops 29, whereupon it is free to drop from the dotted line position in Fig. 5, to the full line position of Fig. 4, in which position the spring 43 overcomes the spring 37 and holds the plunger against operation until the trigger disengages the rack from the gear wheel 36 and releases the plunger. It will thus be seen that, responsive to the operation of the trigger mechanism, the plunger is thrust forward by the spring 37 and is thrust back by the spring 43 against the action of the spring 37 and held, and in this manner the trap is capable of repeated operation until the power stored in the spring 43 is insufficient to overcome the spring 27 and reset the plunger in the position shown in Fig. 4. The necessity for the flanges 30 and guides 35 is that they co-act to positively hold the plunger, while moving between its extreme positions, in engagement with or disengaged from the gear 36 and thus prevent anything short of a full stroke in either direction for the plunger. The pointed spuds on the plunger head may be designed to kill or impale the quarry but preferably they are intended to disable it and deposit it in the compartment 1 where the door 2 automatically closes behind it so that the apparatus may continue to operate until the entrapped quarries prevent the operation of the door.

The trap may be of any size according to the quarry it is intended to operate on and in describing its preferred construction I desire it to be understood that the mechanism may be materially varied without departing from the real ideas underlying my invention.

Having thus described my invention, what I claim as new and desire to secure by Letters Patent, is:—

1. A trap comprising a trigger mechanism, a spring-pressed plunger adapted to be released by said trigger mechanism and to spring forward and strike a quarry while in the act of tripping said trigger mechanism, a stop to limit the stroke of the plunger, and a compartment having a self closing door disposed just beyond the limit of the plunger's forward stroke and adapted to be opened by the impact of the quarry and admit it to said compartment.

2. A trap comprising a trigger mechanism, a spring-pressed striker adapted to be released by said trigger mechanism, a spring to thrust the striker forward to strike a quarry while in the act of tripping said trigger mechanism, spring motor driven means automatically operable to reset the spring-pressed striker against the action of the spring which thrusts it forward, and means to reset the trigger mechanism.

3. In a trap, a trigger mechanism, a reciprocable plunger, means operated by the trigger mechanism to depress the plunger, a compression spring acting to thrust the plunger forward, resetting means to retract and hold the plunger in retracted position with its spring compressed from which means it is released only while depressed, and co-acting means to lock the resetting means and hold the plunger in depressed position during its thrusting movement, substantially as described.

4. A trap comprising a trigger mechanism, a spring-pressed plunger adapted to be released by said trigger mechanism and to spring forward and strike a quarry while in the act of tripping said trigger mechanism, a spring to thrust said plunger forward, motor driven means automatically operable to reset the plunger, means to reset the trigger mechanism, and a storage compartment having a trap door disposed to be opened by the plunger to admit the quarry into said compartment.

5. A trap comprising a trigger mechanism and a plunger, a spring adapted to thrust the plunger forward, a spring adapted to retract the plunger against the action of the first mentioned spring, and mechanism controlled by the trigger mechanism for bringing said springs alternately into control of the plunger to release it for operation and to reset it.

6. A trap comprising a trigger mechanism, a spring-pressed striker, a driving spring for the striker, power means to retract and hold the striker retracted with its driving spring under tension, latch means for said power means, and means controllable by the trigger mechanism and operable thereby to first release the striker and hold the power mechanism and at the end of the striker's stroke to release the power mechanism and means to operatively connect the power mechanism to the striker to retract it and restore the tension to its driving spring.

7. A trap comprising a trigger mechanism, a reciprocable plunger adapted to strike the quarry while on the trigger, a driving spring to thrust the plunger against the quarry, a coiled spring, means driven thereby and adapted to retract the plunger and place its driving spring under compression, said means comprising a spring driven gear, a rack on the plunger, means to move said rack into and out of engagement with said gear, and stop means to limit the reset stroke of the plunger.

8. In a trap, a trigger mechanism, a plunger mounted to reciprocate in the trap, guide flanges on each side of the plunger, fixed guides disposed to be cleared by the plunger flanges at the extreme ends of their travel and in intermediate positions of travel to engage the flanges above or below to hold the plunger at a given level, a spring motor having a driving gear, a rack on the plunger adapted to engage the gear in the elevated position of the plunger and to be disengaged from the gear in the lower position of the plunger, a spring adapted to thrust the plunger forward, latch means to lock the motor, and connections from the trigger mechanism to both plunger and latch and arranged to release the latch only when the plunger rack is in mesh with the gear.

9. In a trap, a reciprocable plunger with spring means to thrust it forward and stops to limit its travel, a trigger mechanism having a sliding connection with the plunger and adapted to raise and lower it, and a spring motor driven means releasable by the trigger mechanism and adapted to engage and reset the plunger against the action of its spring and to hold it in reset position, and means controlled by the trigger mechanism to lock the spring motor and disengage the plunger therefrom, said means holding the motor locked until the plunger has completed its stroke and resumes engagement with the motor, substantially as described.

10. In a trap, a striker, a spring means to thrust the striker forward, a stronger spring means to retract the striker and put its thrusting spring means under tension, and trigger controlled mechanism to control the operation of both spring means on the striker.

11. A trap including a casing, a movable striker having a rack bar thereon said rack bar extending into said casing, means in said casing for engaging said rack bar to retain said striker in a set position, quarry operated means having means connected thereto adapted to engage said rack bar to disengage the same from said first mentioned means and allow for the movement of said striker and automatically operated means including said first mentioned means to move said rack bar and return said striker to a set position.

12. A trap comprising a base, a casing thereon, a spring actuated striker associated with said casing, a rack bar on said striker and projected into said casing, a driven cog wheel in said casing, said cog wheel in engagement with said rack bar to normally hold the same so as to retain said striker in a set position, means for disengaging said rack bar from said gear wheel, and enlargements on said casing and said rack bar adapted to abut whereby said rack bar is returned to engagement with said gear wheel and by movement of the same return said striker to a set position.

13. A trap including a casing, a movable striker, a rack bar on said striker and extending into said casing, means in said casing for engaging said rack bar to retain said striker in a set position, a quarry operated means having means connected thereto adapted to engage said rack bar to disengage said rack bar from said first mentioned means and allow for the movement of said striker.

In testimony whereof I affix my signature.

WILLIAM FELIX CORNELIUS.

Witness:
    Nomie Welsh.

Copies of this patent may be obtained for five cents each, by addressing the "Commissioner of Patents, Washington, D. C."